Dec. 9, 1952 J. C. PONTIUS 2,621,252

INTERFERENCE-SUPPRESSION NETWORK

Filed Feb. 11, 1949

INVENTOR.
John C. Pontius
BY [signature]
ATTORNEY

Patented Dec. 9, 1952

2,621,252

UNITED STATES PATENT OFFICE 2,621,252

INTERFERENCE-SUPPRESSION NETWORK

John C. Pontius, Williamsville, N. Y., assignor, by mesne assignments, to Sylvania Electric Products Inc., New York, N. Y., a corporation of Massachusetts Application February 11, 1949, Serial No. 75,878

2 Claims. (Cl. 178—44)

The present invention relates to ignition-interference-suppression networks and, particularly, to such networks of a type having utility in radio receivers operated in the vicinity of gasoline engines as in automobiles and airplanes.

The ignition system of a gasoline engine may often give rise to severe interference with radio reception, particularly when the radio receiver is supported for operation at a location in a vehicle near the engine or electrical circuit conductors associated therewith. To reduce or avoid such interference, radio receivers designed for such applications conventionally are enclosed within a metallic housing to shield the radio apparatus from the electromagnetic fields set up by ignition currents and voltages. In addition, an ignition-interference suppression network is conventionally included within the housing and in each electrical circuit through which the radio apparatus is energized from a suitable source carried by the vehicle. These networks comprise one or more network sections each including an inductor in series with the energizing-circuit conductor and one or more condensers connected in shunt to the energizing circuit at a point adjacent the inductor terminals.

The interference-suppression networks heretofore proposed have involved a more expensive construction and have required a larger volume of mounting space than is desirable for many applications. This has been particularly true in automobile receivers where it is highly desirable to minimize the cost and the space requirements of the receiver.

It is an object of the present invention, therefore, to provide a new and improved ignition-interference-suppression network of low cost and small physical size.

It is a further object of the invention to provide an ignition - interference - suppression network having a very sturdy and compact construction and one which is characterized by high efficiency of interference suppression.

For a better understanding of the present invention, together with other and further objects thereof, reference is had to the following description taken in connection with the accompanying drawing, and its scope will be pointed out in the appended claims.

Figure 1:
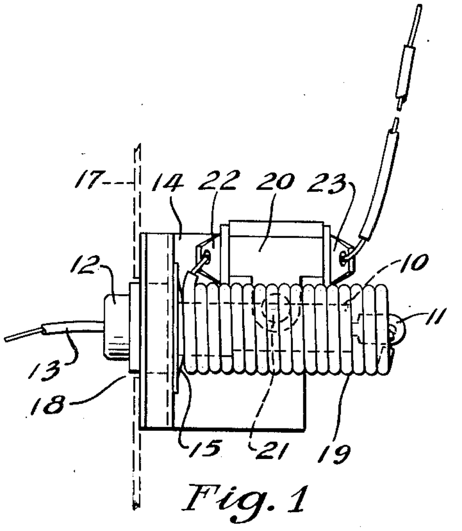
Figure 2:
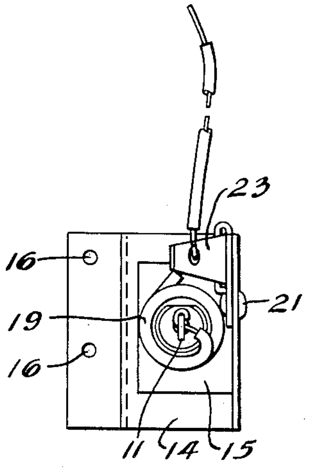
Figure 3:
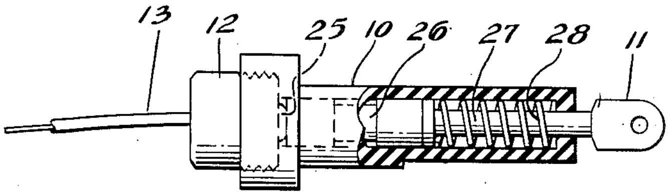
Figure 4:
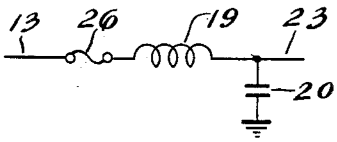

Referring now to the drawing, Figure 1 illustrates an ignition-interference-suppression network embodying the present invention in a particular form; Figure 2 is any end view of the Figure 1 network; Figure 3 illustrates, partly in cross-section, the construction of a fuse holder used in the network arrangement of Fig. 1; and Figure 4 represents the electrical circuit diagram of a network embodying the invention.

Referring now more particularly to Figs. 1 and 2 of the drawing, the network includes an elongated fuse holder 10 having an electrical terminal 11 at one end and providing at its opposite end a receptacle for receiving and holding a male electrical connector plug 12. The latter has a centrally positioned terminal to which is connected an electrical conductor 13 which may, in turn, be connected to one terminal of a suitable source of energizing current, not shown. The fuse holder 10 is inserted through an aperture provided in an electrically conductive bracket 14 and is maintained in assembly relation with the bracket by a conventional speed-nut 15. A flange portion of the bracket 14 is provided with apertures 16, 16 by which the bracket may be mechanically secured and electrically connected, as by rivets or machine screws, to a wall 17 of a metallic housing which encloses a radio receiver with which the ignition-interference-suppression network is used. The housing wall 17 includes an aperture 18 through which the fuse holder 10 extends, or with which it is aligned, to provide a fused electrical circuit extending through the wall 17 in insulated relation therewith.

The network also includes an inductor 19 of cylindrical configuration positioned to surround the fuse holder 10 and including end terminals one of which is electrically connected to the terminal 11 of the fuse holder. In particular, the fuse holder 10 is of tubular cross-section and the inductor 19 is wound around the holder for longitudinal support thereby.

The network also includes a condenser 20 which has a first condenser terminal electrically connected to the bracket 14, as by a rivet 21, and a second condenser terminal 22 which is electrically connected to the remote terminal of the inductor 19. A condenser terminal 23 is common with the terminal 22 and provides a terminal within the housing for electrical connection to the fused circuit.

Figure 3 illustrates, partly in cross section, a fuse holder of suitable construction for use in a suppression network embodying the invention. The male electrical connector plug 12 includes a centrally positioned terminal 25, as earlier mentioned, which engages a conductive end terminal of a tubular fuse 26. The other terminal of the latter engages the flattened end of a conductor 27 having at its remote end the terminal 11. A helical spring 28 maintains firm engagement between the member 27 and one terminal of the fuse 26 and between the other terminal of the latter and the terminal 25 of the plug 12.

Considering now the operation of the network described, and referring to the electrical circuit arrangement thereof represented by Figure 4, it will be apparent that electrical current is supplied through the conductor 13 from a current source, not shown, to the output terminal 23 of the network through the fuse 26 and inductor 19 in series. Since the undesirable ignition-interference currents which disturb radio reception have very high frequencies as is well known, any such currents tending to flow into the receiver housing through the conductor 13 immediately encounter the inductor 19 which has very high impedance at these frequencies. Any interfering currents of small magnitude which progress through the inductor 19 are immediately shunted to ground through the condenser 20 which has sufficient capacitance as to have a very low impedance at the frequencies of the interfering current. It may be noted from Fig. 1 that the magnetic field of the current traversing the conductive circuit of the fuse holder 10 is at right angles to the magnetic field produced by the current flowing through the inductor 19 so that magnetic-field coupling between the conductive circuit of the fuse holder and the output terminal portion of the inductor is minimized. It may further be noted that the condenser 20 is effective to maintain its terminal 22 substantially at ground potential for currents of interfering frequencies, so that the output turns of the inductor 19 provide some electric-field shielding of the conductive circuit of the fuse holder by virtue of the connection of the output terminal of the inductor 19 to the condenser terminal 22.

It will be apparent from the foregoing description of the invention that a network embodying the invention involves a very simple yet sturdy construction and one which utilizes a fuse holder in the dual capacity of providing its normal function of holding an electrical fuse and also the function of providing longitudinal support for the inductor of the network. The network of the invention, in addition to good efficiency of interference suppression, is of relatively simple and inexpensive construction and requires a minimum volume for mounting.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An ignition-interference suppression network, for a radio receiver enclosed within a metallic housing, comprising: an elongated fuse-holder having an electrical terminal at one end and securable at its opposite end in an aperture in a wall of said housing, said holder being constructed of insulating material and being hollow to receive a replaceable cartridge fuse having a terminal at one end engaging said first mentioned terminal to provide a fused electrical circuit extending through said wall in insulated relation therewith, said other end of said holder providing a receptacle for receiving and holding a male electrical-connector plug having a terminal engageable with another terminal of said fuse, an inductor of elongated cylindrical configuration positioned to surround said holder and including end terminals one of which is electrically connected to said first-mentioned terminal, and a condenser having a first terminal for electrical connection to said housing adjacent said aperture and a second terminal electrically connected to the other terminal of said inductor to provide a terminal within said housing for electrical connection to said circuit.

2. An ignition-interference suppression network, for a radio receiver enclosed within a metallic housing, comprising: an electrically conductive bracket adapted to be mechanically secured and electrically connected to a wall of said housing adjacent an aperture therein, an elongated fuse-holder having an electrical terminal at one end and supported at its opposite end by said bracket in alignment with said aperture, said holder being constructed of insulating material and being hollow to receive a replaceable cartridge fuse having a terminal at one end engaging said first mentioned terminal to provide a fused electrical circuit extending through said wall in insulated relation therewith, an inductor of elongated cylindrical configuration positioned to surround said holder and including end terminals one of which is electrically connected to said first-mentioned terminal, and a condenser supported by said bracket with a first condenser terminal electrically connected thereto and a second condenser terminal electrically connected to the other terminal of said inductor to provide a terminal within said housing for electrical connection to said circuit.

JOHN C. PONTIUS.

REFERENCES CITED

The following references are of record in the file of this patent:

UNITED STATES PATENTS

| Number | Name | Date |
|---|---|---|
| 814,482 | Singer | Mar. 6, 1906 |
| 1,772,776 | Ludwig | Aug. 12, 1930 |
| 1,913,532 | Bohner | June 13, 1933 |
| 2,174,476 | Pittman | Sept. 26, 1939 |
| 2,277,216 | Epstein | Mar. 24, 1942 |
| 2,305,394 | Smith | Dec. 15, 1942 |
| 2,368,474 | Keister | Jan. 30, 1945 |